United States Patent
Xiao et al.

(10) Patent No.: US 12,269,763 B1
(45) Date of Patent: Apr. 8, 2025

(54) TREATMENT METHOD FOR COMPLETE HARMLESS TREATMENT OF ACTIVATED SLUDGE AND COMPLETE RESOURCE UTILIZATION OF ACTIVATED SLUDGE'S PRODUCTS

(71) Applicants: Min He, Dongguan (CN); Poxi He, Nanning (CN); Lecheng Xiao, Hanchuan (CN)

(72) Inventors: Lecheng Xiao, Hanchuan (CN); Wenzhi Liu, Guangzhou (CN); Poxi He, Nanning (CN); Min He, Dongguan (CN)

(73) Assignees: Min He, Dongguan (CN); Poxi He, Nanning (CN); Lecheng Xiao, Hanchuan (CN)

( * ) Notice: Subject to any disclaimer, the term of this patent is extended or adjusted under 35 U.S.C. 154(b) by 0 days.

(21) Appl. No.: 18/785,323

(22) Filed: Jul. 26, 2024

(51) Int. Cl.
  *C02F 11/131* (2019.01)
  *C02F 11/00* (2006.01)
  *C02F 101/20* (2006.01)

(52) U.S. Cl.
  CPC .......... *C02F 11/131* (2019.01); *C02F 11/004* (2013.01); *C02F 2101/203* (2013.01); *C02F 2209/06* (2013.01); *C02F 2209/07* (2013.01); *C02F 2209/44* (2013.01)

(58) Field of Classification Search
  None
  See application file for complete search history.

(56) References Cited

U.S. PATENT DOCUMENTS

| | | | |
|---|---|---|---|
| 2005/0199547 A1* | 9/2005 | Matsumoto ........... | C02F 3/1221 210/609 |
| 2010/0187182 A1* | 7/2010 | Vago ..................... | A01K 63/04 422/128 |

* cited by examiner

*Primary Examiner* — Peter Keyworth
(74) *Attorney, Agent, or Firm* — Bay State IP, LLC

(57) ABSTRACT

The present disclosure provides a treatment method for complete harmless treatment of activated sludge and complete resource utilization of activated sludge's products, belonging to the technical field of activated sludge treatment. The treatment method provided by the present disclosure comprises ultrasonic treatment, microwave treatment and/or vapor treatment, solid-liquid separation, microbial mineralization treatment, acidification treatment, and other steps. In the present disclosure, various steps are collaborative with one another, can successfully and completely convert activated sludge into organic fertilizers, ferrite materials, industrial silica sol and other products, thereby achieving the complete utilization of activated sludge. Furthermore, the obtained products have high quality, and all meet related quality standards. The present disclosure can solve the problems of complete resource utilization of activated sludge that cannot be achieved in the prior art, poor economic benefits, complicated process and the like, and is suitable for industrial development.

10 Claims, 1 Drawing Sheet

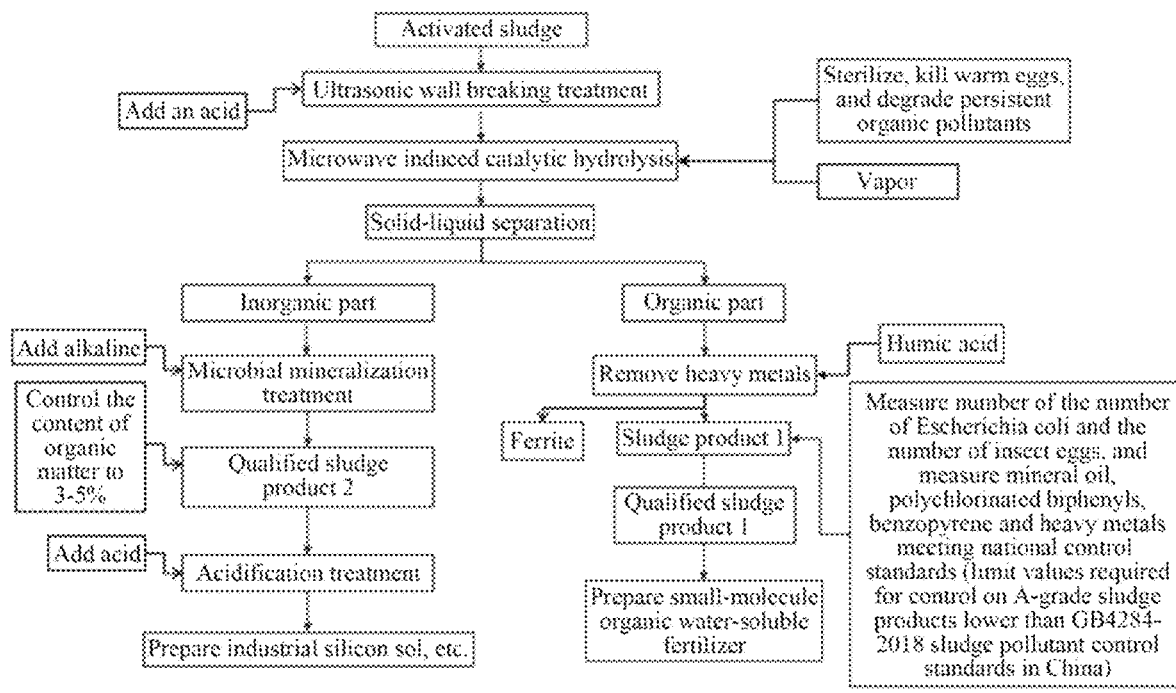

TREATMENT METHOD FOR COMPLETE HARMLESS TREATMENT OF ACTIVATED SLUDGE AND COMPLETE RESOURCE UTILIZATION OF ACTIVATED SLUDGE'S PRODUCTS

CROSS REFERENCE TO RELATED APPLICATION

This application claims the benefit of and takes priority from Chinese Patent Application No. 2024102539528 filed on Mar. 6, 2024, the contents of which are herein incorporated by reference.

TECHNICAL FIELD

The present disclosure relates to the technical field of activated sludge treatment, in particular to a treatment method for complete harmless treatment of activated sludge and complete resource utilization of activated sludge's products.

BACKGROUND

In principle, an activated sludge method for treating the urban sewage by using a biochemical treatment method is a process for converting the suspended, colloidal or dissolved substances in sewage into biochemical solids, and separating the biochemical solids from a water body.

The activated sludge contains a large amount of organic matters and nutrients, pathogenic bacteria, parasite eggs, heavy metals, and some toxic and harmful organic and inorganic bacterial micelles that are difficult to degrade, and has the characteristics of high moisture content, easy corruption, generation of odor and the like. The sewage treatment processes of the urban sewage plants will necessarily generate activated sludge, in a sense, treating the sludge of the urban sewage plants with the activated sludge method is just to enrich or convert and separate toxic and harmful substances in the sewage rather than a complete treatment process. Treating the activated sludge according to the present disclosure is to guarantee and intensify the environment functions of the urban sewage plants.

Activated sludge treatment is an important part for water contamination control and water environment protection and also is an important issue faced by the related sewage treatment plants and urban health environment, and the activated sludge treatment is also recognized as one of contaminants that is the most difficult to treat in the field of solid-liquid separation.

The existing technology discloses multiple activated sludge treatment methods, for example, the Chinese patent No. CN104230129A discloses an activated sludge treatment method, comprising: 1, adding a heavy metal adsorbent into a sludge settling pond of a sewage biological treatment device; 2, concentrating sludge; 3, carrying out anaerobic digestion on sludge; 4, carrying out mechanical filter pressing and dehydration; 5, carrying out microbial remediation; 6, disinfecting a sludge cake; 7, feeding the sludge cake into an ultrasonic electric heating device; 8, feeding the sludge cake into a filter press again for mechanical filter pressing and dehydrating; and 9, feeding the sludge cake into a granulating machine for granulation, and drying and packaging. The treatment of sludge using this method can completely remove heavy metal ions and volatile organic matters in sludge. However, the volatile organic matters that are difficult to decompose in this scheme are escaped from sludge, the heavy metal ions are only simply adsorbed, and harmful waste materials can also be generated in the process, which increases additional treatment cost; furthermore, this scheme cannot achieve the complete resource utilization of activated sludge, with poor economic benefits.

Chinese patent CN101591130A discloses a treatment method for complete resource utilization and zero emission of activated sludge, in which cell walls are broken by using ultrasonic waves so that the contents of a bacterial body are dissolved out, heavy metals are then removed, and an organic part used for preparing microbial proteins and an inorganic part used for preparing organic fertilizers are separated; however, the step of preparing the organic fertilizer in this scheme requires additional addition of a large amount of organic materials, and therefore this scheme is complex in process, high in cost, and is not suitable for promotion and application in practical industries.

SUMMARY

The objective of the present disclosure is to provide a treatment method for complete harmless treatment of activated sludge and complete resource utilization of activated sludge's products, thereby achieving the efficient utilization of activated sludge and complete conversion of activated sludge into industrial products.

In order to achieve the above objective of the present disclosure, the present disclosure provides the following technical scheme:

The present disclosure provides a treatment method for complete harmless treatment of activated sludge and complete resource utilization of activated sludge's products, comprising the following steps:

S1, adjusting the pH of activated sludge below 5 to obtain a mixture 1;

S2, performing ultrasonic treatment on the mixture 1 to obtain a mixture 2;

S3, performing microwave treatment and/or vapor treatment on the mixture 2 to obtain a mixture 3;

S4, performing solid-liquid separation on the mixture 3 to obtain a liquid portion 1 and a solid portion 1;

S5, mixing the solid portion 1 with a composite mineralizing agent and a mineralization bactericide for mineralization treatment to obtain a mineralized product; and S6, mixing the mineralized product with an acidifying agent for acidification treatment to obtain an acidified product, so as to accomplish the complete resource utilization of activated sludge;

wherein, the liquid portion 1 in S4 is used for preparing an organic fertilizer and/or a ferrite material;

the acidified product in S6 is used for preparing industrial silica sol.

Preferably, in S2, the frequency of the ultrasonic treatment is 5-40 kHz;

the intensity of the ultrasonic treatment is 1-30 $W/cm^2$.

Preferably, in S2, the temperature of the ultrasonic treatment is 60-90° C.;

the time of the ultrasonic treatment is 30-100 min.

Preferably, in S3, the frequency of the microwave treatment is 500-1000 MHz;

the power of the microwave treatment is 5-10 W/g;

the temperature of the vapor treatment is 120-180° C.;

the time of the vapor treatment is 1~4 h.

Preferably, in S3, the temperature of the microwave treatment is 120-180° C.;

the time of the microwave treatment is 180-250 s.

Preferably, the composite mineralizing agent contains CaO and MgO, and a weight ratio of CaO to MgO in the composite mineralizing agent is 6-8:3;

when the solid portion 1 is mixed with the composite mineralizing agent, a mass ratio of the solid portion 1 to the composite mineralizing agent is 100:1-10;

the mineralization bactericide contains jelly-like *bacillus*;

the viable count of the jelly-like *bacillus* is $1-5\times10^8$ bacteria/mL;

a mass ratio of the mineralization bactericide to the solid portion 1 is 1-10:100.

Preferably, the mineralization treatment adopts alkaline conditions;

the temperature of the mineralization treatment is 20-40° C.;

in the mineralization treatment, the oxygen content is controlled at 3 mg and above.

Preferably, the acidifying agent is a sulfuric acid aqueous solution, and the volume fraction of the sulfuric acid aqueous solution is 20-40%;

a mixing weight ratio of the mineralized product to the acidifying agent is 1:3-5.

Preferably, the temperature of the acidification treatment is 250-350° C.;

the time of the acidification treatment is 2-6 h.

Preferably, after the liquid portion 1 is obtained in S4, heavy metals are removed to obtain heavy metal-containing ferrite and a liquid portion 2;

the liquid portion 2 is used for preparing a small-molecule organic water-soluble fertilizer;

the heavy metal-containing ferrite is used for preparing iron ore powders.

The present disclosure has the beneficial effects:

The treatment method for complete harmless treatment of activated sludge and complete resource utilization of activated sludge's products provided by the present disclosure comprises ultrasonic treatment, microwave treatment and/or vapor treatment, solid-liquid separation, microbial mineralization treatment, acidification treatment, and other steps. In the present disclosure, steps are all linked with one another, which can successfully and completely convert activated sludge into organic fertilizers, ferrite materials, industrial silica sol and other products, thereby achieving the complete utilization of activated sludge. Furthermore, the obtained products have high quality, all meet related quality standards, and are suitable for industrial promotion. In the overall process of the treatment method for complete harmless treatment of activated sludge and complete resource utilization of activated sludge's products provided by the present disclosure, there is no odor gas and greenhouse gas emission, so as to ensure environmental friendliness while achieving complete resource utilization, thereby avoiding the generation of additional treatment cost.

BRIEF DESCRIPTION OF THE DRAWINGS

FIG. 1 is a process flowchart according to the present disclosure.

DETAILED DESCRIPTION OF THE EMBODIMENTS

The present disclosure provides a treatment method for complete harmless treatment of activated sludge and complete resource utilization of activated sludge's products, comprising the following steps:

S1, adjusting the pH of activated sludge below 5 to obtain a mixture 1;

S2, performing ultrasonic treatment on the mixture 1 to obtain a mixture 2;

S3, performing microwave treatment and/or vapor treatment on the mixture 2 to obtain a mixture 3;

S4, performing solid-liquid separation on the mixture 3 to obtain a liquid portion 1 and a solid portion 1;

S5, mixing the solid portion 1 with a composite mineralizing agent and a mineralization bactericide for mineralization treatment to obtain a mineralized product; and S6, mixing the mineralized product with an acidifying agent for acidification treatment to obtain an acidified product, so as to accomplish the complete resource utilization of activated sludge;

wherein, the liquid portion 1 in S4 is used for preparing an organic fertilizer and/or a ferrite material;

the acidified product in S6 is used for preparing industrial silica sol.

The activated sludge of the present disclosure can be from activated sludge produced by using biochemical methods in urban sewage treatment plants or food industry sewage treatment plants.

In the present disclosure, in S1, the pH of activated sludge is adjusted below 5, preferably the pH of activated sludge is adjusted to 1-3, further preferably 1.5-2.5; for the pH adjustment, a strong acid aqueous solution is preferably adopted as an acid/base adjusting agent and the strong acid aqueous solution is preferably a sulfuric acid aqueous solution, the volume fraction of the sulfuric acid aqueous solution is preferably 20-40%, further preferably 25-35%.

In the present disclosure, in S2, the frequency of the ultrasonic treatment is preferably 5-40 kHz, further preferably 10-20 kHz; the intensity of the ultrasonic treatment is preferably 1-30 W/cm$^2$, further preferably 10-20 W/cm$^2$; the temperature of the ultrasonic treatment is preferably 60-90° C., further preferably 70-80° C., and the time of the ultrasonic treatment is preferably 50-80 min.

In the present disclosure, combination of a pH adjustment step with an ultrasonic treatment step can damage cell walls of microbial biomass in sludge *zoogloea* so that the contents in cells are dissolved out to precipitate in follow-up treatment steps, and can damage the close binding of microbial biomass with inorganic sludge so as to facilitate the follow-up further treatment.

In the present disclosure, in S3, the frequency of the microwave treatment is preferably 500-1000 MHz, further preferably 700-900 MHz; the power of the microwave treatment is preferably 5-10 W/g, further preferably 6-8 W/g; the temperature of the microwave treatment is preferably 120-180° C., further preferably 140-160° C.; the time of the microwave treatment is preferably 180-250 s, further preferably 200-230 s; the temperature of the vapor treatment is 120-180° C.; and the time of the vapor treatment is 1~4 h. In the present disclosure, the vapor treatment or the microwave treatment can be carried out separately or synergistically. When synergizing, equipment that can automatically switch between the two processes can be used, with a total treatment time of 1-4 h.

The microwave and/or vapor steps in the present disclosure can kill biological pollution source components in activated sludge, such as *Escherichia coli*, roundworm eggs and viruses, can also degrade mineral oil into nutrient components of small-molecule alkanol and alkanoic acid, and allows oxygen atoms connected with each other in persistent organic pollutants, polychlorinated biphenyls and benzopyrenes to be attacked by hydrogen ions released by acid hydrolysis to form a molecule of water to be broken, and a benzene ring and heterocycle are opened by microwave catalytic hydrolysis or vapor heating to form harmless nutritional components of linear small molecule organic acids; microbial contents such as polysaccharides, proteins, fats and ribonucleic acids obtained in the previous steps are degraded into small-molecule amino acid, peptide, oligosaccharide, fatty acid, alcohol and nucleotide substances. Such the step can be combined with subsequent steps to achieve an effect that the quality of the finally output product is superior to that specified in relevant standards. The optimal treatment effect can be achieved through a parameter range provided by the present disclosure.

In the present disclosure, the solid-liquid separation in S4 preferably adopts methods such as sedimentation, filtration, membrane filtration, filtering pressing, vacuumizing, centrifuging, gravity concentration, mechanical dehydration, microfiltration, clarifying or deep bed filtration. The liquid portion 1 and solid portion 1 are obtained after the solid-liquid separation. The liquid portion 1 is used for preparing an organic fertilizer and a ferrite material. After the liquid portion 1 is obtained in S4, heavy metal-containing ferrite and a liquid portion 2 are obtained by preferably adopting the removal of heavy metals; the liquid portion 2 is used for preparing a small-molecule organic water-soluble fertilizer; the heavy metal-containing ferrite is used for preparing iron ore powders; the liquid portion 2 obtained through the present disclosure contains small-molecule amino acid, peptide, oligosaccharide, fatty acid, alcohol and nucleotide substances, and is used for producing and preparing a small-molecule organic water-soluble fertilizer or a solid product thereof with an organic matter content >10%, a total nutrient (counted by N+POr+K:O) content ≥5% (a single nutrient >1% of content), a microelement content (sum of six elements including boron, zinc, manganese, iron, copper, molybdenum)>2%, an aluminum content≤0.5%, a water insoluble≤0.5%, and a pH (1+250 times of dilution) of 2.0-9.0 (from China National Standards GB/T17419-2018). The product can meet the indexes, which benefits from a synergistic effect of all the previous steps. The heavy metal-containing ferrite (silicon dioxide ($SiO_2$: w/%) 20-31, sodium oxide (NaO: w/%)≤0.04-0.06, a pH value of 2.0-4.0, from China Chemical Industry Standards HG/T2521-2008) obtained through the present disclosure may serve as iron mine powder raw material.

In the present disclosure, the solid portion 1 obtained in S4 is mixed with the composite mineralizing agent for mineralization treatment to obtain a mineralized product; the composite mineralizing agent preferably contains CaO and MgO, a weight ratio of CaO to MgO in the composite mineralizing agent is 6-8:3; when the solid portion 1 is mixed with the composite mineralizing agent, a mass ratio of the solid portion 1 to the composite mineralizing agent is preferably 100:1-10; the mineralization treatment preferably adopts alkaline conditions, the pH value of the alkaline conditions is preferably 8-10; the temperature of the mineralization treatment is preferably 20-40° C., further preferably 25-35° C.; in the mineralization treatment, the oxygen content is controlled at 3 mg/kg and above, preferably 4-5 mg/kg; a flipping method is preferably used to control the oxygen content, the number of revolution of flipping is preferably 5-15 r/min; the time of the mineralization treatment is preferably 10-72 h, further preferably 30-50 h.

In S5 of the present disclosure, the mineralization bactericide preferably contains jelly-like *bacillus*; the viable count of the jelly-like *bacillus* is preferably $1-5\times10^8$ bacteria/mL, further preferably $2-4\times10^8$ bacteria/mL; a mass ratio of the mineralization bactericide to the solid portion 1 is preferably 1-10:100; the mineralization bactericide of the present disclosure can consume surplus organic matters through propagation, and glue the inorganic sludge part together with the composite mineralizing agent for gluing reaction to form mineralized sludge. This step can provide good material conditions for the mineralization treatment in this step on the basis of all the above-mentioned steps so as to successfully obtain the mineralized product.

In the present disclosure, the acidifying agent in S6 is preferably a sulfuric acid aqueous solution, the volume fraction of the sulfuric acid aqueous solution is preferably 20-40%, further preferably is 25-35%; a mixing weight ratio of the mineralized product to the acidifying agent is 1:3-5, further preferably is 1:3.5-4.5; preferably, the temperature of the acidification treatment is preferably 250-350° C., further preferably 280-320° C.; the time of the acidification treatment is preferably 2-6 h, further preferably 2-3 h; after being cooled, the acidified product in the present disclosure can be used for preparing industrial silica sol, the main ingredient of the product is silicon dioxide, where the silicon dioxide ($SiO_2$: w/%) is 20-31, the sodium oxide (NaO: w/%) is ≤0.04-0.06, and the pH value is 2.0-4.0.

Next, the technical scheme provided by the present disclosure will be described in detail in combination with examples, but cannot be understood as limiting the scope of protection of the present disclosure.

Example 1

(1) Activated sludge was taken, 30% sulfuric acid was added into the above activated sludge to adjust the pH to 1, and then ultrasonic treatment was carried out on the activated sludge subjected to pH adjustment, wherein the frequency of ultrasonic treatment was controlled at 30 kHz, and the intensity of ultrasonic treatment was controlled at 25 W/cm$^2$, and the time of ultrasonic treatment at 60° C. was 35 min.

(2) Microwave treatment was performed on the system subjected to ultrasonic treatment, wherein the frequency of the microwave treatment was controlled at 800 MHZ, a high temperature of 150° C. was generated, the power of the microwave treatment was 8 W/g, and the reaction time was 200 s.

(3) The system subjected to microwave treatment was subjected to solid-liquid separation to form two portions, wherein a liquid portion was an organic part containing heavy metals, and a solid portion was an inorganic part containing organic matters (via determination, the content of the organic matters was 4.7%).

(4) 800 mg/L humic acid was added into the liquid portion for 1 h of reaction, solid-liquid separation was carried out on the above reaction product to form a humic acid sedimentation solid matter containing heavy metals and a small-molecule organic liquid without heavy metals, and the small-molecule organic liquid was labeled as sludge product 1 which was used for preparing a small-molecule organic water-soluble fertilizer or a solid product thereof, with an organic matter content >10%, a total nutrient (counted by N+POr+K:O) content >5% (a single nutrient ≥1% of content), a microelement content (sum of six elements including boron, zinc, manganese, iron, copper, molybdenum)>2%, a water insoluble≤0.5%, and a pH (1+250 times of dilution) of 2.0-9.0 (from China National Standards GB/T17419-2018).

(5) The humic acid sedimentation solid matter containing heavy metals was subjected to dedsorption reaction, the pH value was adjusted to 8.5 and meanwhile ultrasonic treatment with a work frequency of 50 kHz and a temperature of 70° C. was carried out for 5 min, humic acid containing heavy metals was separated, and humic acid was dissolved and reused; the heavy metals obtained by separation were present in a form of hydroxide, and a heavy metal hydroxide can be used for preparing ferrite. The preparation method refers to Chinese patent CN101591130B.

(6) The solid portion obtained in step (4) was subjected to mineralization treatment: on a total weight of the solid portion, a composite mineralizing agent (composed of 70% of CaO and 30% of MgO) was added, until the pH of the system was 8.5, and meanwhile mineralized microbial gelatinous *bacillus* ACCC01075 was added in culture medium 0065 (purchased from China General Microbiological Culture Collection Center (CGMCC)), the viable count of the cultured liquid inoculant was 15 billion/ml, and the addition amount of the liquid inoculant was 5% that of the mineralized sludge. Oxygen supply was performed by flipping at 10 r/min, the oxygen content was maintained at around 4 mg/kg, and the reaction time was 48 h, so as to obtain mineralized sludge which was labeled as sludge product 2.

(7) 40% sulfuric acid whose weight was three times that of a material 3 was added in the sludge product 2, the above materials were heated to 250° C., wherein the reaction time was 2 h, the revolution number of stirring was 30 r/min, and then the obtained mixture was cooled to room temperature of 20° C. to obtain a liquid product mainly containing activated $SiO_2$, meeting the related indexes of industrial silica sol silicon dioxide ($SiO_2$: w/%) 20-31, sodium oxide (NaO: w/%)≤0.04-0.06, and a pH value of 2.0-4.0 (from China Chemical Industry Standards HG/T2521-2008), and serving as cement, a concrete additive, a waterproof material, an anti-corrosion material, an adhesive and other products.

Example 2

An activated sludge which is obtained by separating an organic part from an inorganic part is provided in this example, respectively performing harmless resource utilization on the organic part and the inorganic part and finally achieving complete harmless treatment. The treatment method for complete resource utilization of activated sludge's products comprises the following steps:

S1, the pH of activated sludge was adjusted to 1-3 to obtain a mixture 1;

S2, ultrasonic treatment was performed on the mixture 1 to obtain a mixture 2;

S3, microwave treatment and/or vapor treatment was performed on the mixture 2 to obtain a mixture 3;

S4, solid-liquid separation was performed on the mixture 3 to obtain a liquid portion and a solid portion;

S5, humic acid was added into the liquid portion to remove heavy metals to obtain heavy metal-containing ferrite which was made into iron mine powder with (mass fraction) TFe≥48.0-65%, $SiO_2$≤3.5-15.0%, $Al_2O_3$≤1.5-4.0%, P≤0.05-0.15% and S≤0.03-0.11% (from 1-5 grade iron mine standards in China Black Metallurgy Industry Standards YB/T4267-2011). The remaining organic portion served as the sludge product 1 meeting the pollutant control requirements of a total cadmium (counted by a dry basis)/(mg/kg)<3, a total mercury (counted by a dry basis)/(mg/kg)<3, a total plumbum (counted by a dry basis)/(mg/kg)<300, a total chromium (counted by a dry basis)/(mg/kg)<500, a total arsenic (counted by a dry basis)/(mg/kg) <30, a total nickel (counted by a dry basis)/(mg/kg)<100, a total zinc (counted by a dry basis)/(mg/kg)<200, a total copper (counted by a dry basis)/(mg/kg)<500, mineral oil (counted by a dry basis)/(mg/kg)<500, Benzoapyrene (counted by a dry basis)/(mg/kg)<2, polycyclic aromatic hydrocarbon (PAHs) (counted by a dry basis)/(mg/kg)<5 (from Control Standards of Pollutants in Sludge for Agricultural Use of China National Standards GB4284-2018), and the sludge product 1 was used for producing the raw material product of the small-molecule organic water-soluble fertilizer or the solid product thereof with an organic matter content >10%, a total nutrient (counted by N+POr+K:O) content >5% (a single nutrient ≥1% of content), a microelement content (sum of six elements including boron, zinc, manganese, iron, copper, molybdenum)>2%, a water insoluble≤0.5%, and a pH (1+250 times of dilution) of 2.0-9.0 (from China National Standards GB/T17419-2018).

S6, composite mineralizing agents calcium oxide and magnesium oxide and a microbial bactericide with a mineralization function were successively added into the inorganic solid portion to be mixed, and then the obtained mixture was mineralized so that the content of organic matters was 3%-5% to obtain sludge product 2.

S7, sulfuric acid was added into the sludge product 2 to be mixed, to obtain acidic silicon sol with silicon dioxide ($SiO_2$: w/%) 20-31, sodium oxide (NaO: w/%)≤0.04-0.06, and a pH value of 2.0-4.0 (from China Chemical Industry Standards HG/T2521-2008).

In S2, the frequency of the ultrasonic treatment was 5-40 kHz; the intensity of the ultrasonic treatment was 1-30 $W/cm^2$;
  in S2, the temperature of the ultrasonic treatment was 60-90° C.; the time of the ultrasonic treatment was 30-100 min;
  in S3, the frequency of the microwave treatment was 500-1000 MHz; the power of the microwave treatment was 5-10 W/g; the temperature of auxiliary vapor replacement treatment was 120-180° C.; the time of the vapor treatment was 1~4 h;
  in S3, the temperature of the microwave treatment was 120-180° C.; the time of the microwave treatment was 180-250 s;
  the composite mineralizing agent contained 70% of CaO and 30% of MgO, and the addition amount of the mineralizing agent aimed to control the pH of sludge to 8.5;
  when the solid portion was mixed with the composite mineralizing agent, a mass ratio of the solid portion to the composite mineralizing agent was 100:1-10;
  the mineralization bactericide contained jelly-like *bacillus* which was selected from culture medium 0067 from Chinese bacterial strain catalogue ACCC10092 (purchased from CGMCC);
  the viable count of the jelly-like *bacillus* was $1-5\times10^8$ bacteria/mL;
  a mass ratio of the mineralization bactericide to the solid portion 1 was 1-10:100;
  the alkaline condition adopted by the mineralization treatment was pH8.5;
  the temperature of the mineralization treatment was 20-40° C.;
  in the mineralization treatment, the oxygen content was controlled at 1 mg/kg-3 mg/kg, the time of microbial mineralization treatment was 24 h-72 h, and the content of the organic matters was controlled at 3%-5%;

the acidifying agent was a sulfuric acid aqueous solution, and the concentration of the sulfuric acid aqueous solution was 20-40%;

a mixing weight ratio of the mineralized sludge product to the sulfuric acid aqueous solution was 1:3-5;

the temperature of the acidification treatment was 250-350° C.;

the time of the acidification treatment was 2-6 h.

After the liquid portion was obtained in S4, heavy metals were removed by using a humic acid treatment method. The heavy metal-containing ferrite was prepared and used for producing the iron mine powder meeting the standard.

the humic acid treatment method comprised the following steps:

S4.1, the liquid portion was mixed with humic acid so that pH was 1-3, and adsorption treatment was performed to obtain a mixture 4;

S4.2, the mixture 4 was subjected to solid-liquid separation to obtain an organic liquid portion, i.e., sludge product 1, and inorganic solid portion 2;

S4.3, the pH value of the inorganic solid portion 2 was adjusted to 8-9 for desorption reaction, a humic acid solution which was recycled and a heavy metal hydroxide were obtained by separation; a heavy metal-containing ferrite material was produced by using the patent disclosed by the inventor as a raw material for producing iron mine powders.

The heavy metal hydroxide in S4.3 was used for preparing a ferrite material, the liquid portion without heavy metals was sludge product 1 as the disclosed patent of the inventor, and the small-molecule organic water-soluble fertilizer or the solid product thereof meeting an organic matter content >10%, a total nutrient (counted by N+POr+K:O) content >5% (a single nutrient ≥1% of content), a microelement content (sum of six elements including boron, zinc, manganese, iron, copper, molybdenum)>2%, and a pH (1+250 times of dilution) of 2.0-9.0 (from China National Standards GB/T17419-2018) was prepared.

The detection index of sludge product 1 referred to a total cadmium (counted by a dry basis)/(mg/kg)<3, a total mercury (counted by a dry basis)/(mg/kg)<3, a total plumbum (counted by a dry basis)/(mg/kg)<300, a total chromium (counted by a dry basis)/(mg/kg)<500, a total arsenic (counted by a dry basis)/(mg/kg)<30, a total nickel (counted by a dry basis)/(mg/kg)<100, a total zinc (counted by a dry basis)/(mg/kg)<200, a total copper (counted by a dry basis)/(mg/kg) <500, mineral oil (counted by a dry basis)/(mg/kg) <500, Benzoapyrene (counted by a dry basis)/(mg/kg)<2, polycyclic aromatic hydrocarbon (PAHs) (counted by a dry basis)/(mg/kg) <5 (from Control Standards of Pollutants in Sludge for Agricultural Use of China National Standards GB4284-2018), where the total cadmium (on a dry basis)/(mg/kg)<3, the measured value of sludge product 1 was 1.2; total mercury (on a dry basis)/(mg/kg)<3, the measured value of the sludge product was 0.3; total lead (on a dry basis)/(mg/kg)<300, the measured value of the sludge product was 78; total mercury chromium (on a dry basis)/(mg/kg)<500, the measured value of the sludge product was 123; total nickel (on a dry basis)/(mg/kg)<100, the measured value of the sludge product was 26; total zinc (on a dry basis)/(mg/kg)<1200, the measured value of sludge product was 800; total copper (on a dry basis)/(mg/kg)<500, the measured value of sludge product was 400; mineral oil (on a dry basis)/(mg/kg)<500, the measured value of sludge product was 86; benzo (a) pyrene (on a dry basis)/(mg/kg) <2, and the measured value of sludge product was 0.1; polycyclic aromatic hydrocarbons (PAHs) (on a dry basis)/(mg/kg)<5, the measured value of sludge products was 0.8; the mortality rate/% of roundworm eggs was >95%, and measured value of sludge products was 100%; the value of coliform-like bacteria was >0.01, and the measured value of sludge products was not detected.

The content of the surplus organic matters of the sludge product 2 subjected to solid-liquid separation was 4.7%, and the content of the colloid organic matters of the sludge product 2 was 4.5%. After being acidified, the sludge product 2 was prepared into a cement concrete additive product containing active silica as a main component. Referring to SW-20 in Table 2 in China Chemical Industrial Standards HG/T2521-2018, the content of active silica was >20%, the measured value of the active silica of the cement concrete product formed by acidification of the sludge product 2 was 26%.

Referring to an organic matter content >10%, a total nutrient (counted by N+POr+K:O) content >5% (a single nutrient >1% of content), a microelement content (sum of six elements including boron, zinc, manganese, iron, copper, molybdenum)>2%, a water insoluble≤0.5%, and a pH (1+250 times of dilution) of 2.0-9.0 (from China National Standards GB/T17419-2018), the small-molecule organic water-soluble fertilizer prepared from the sludge product 1 was compared with the actually measured value of the small-molecule organic water-soluble fertilizer prepared from the sludge product 1, the standard value of the organic matter was >10%, and the measured value of the product was 12%. The standard value of the $N+P_2O_5+K_2O$ total amount was >8%, and the measured value of the product was 9.8%. The standard value of the pH value (1+250 times of water dilution) was 2-9, and the measured value of the product was 4.5%; the national standard value of the water-insoluble matter content was ≤0.5%, and the measured value of the product was 0.3%.

Experiment Example

The detection standard and results of product sludge product 1 in example 1 are as shown in Table 1.

TABLE 1

Detection results of sludge product 1

| Items | National standard 4284-2018 Specified limits of A-grade sludge product | Example 1 Sludge product 1 |
|---|---|---|
| Total cadmium (on a dry basis)/(mg/kg) | <3 | 1.2 |
| Total mercury (on a dry basis)/(mg/kg) | <3 | 0.3 |
| Total lead (on a dry basis)/(mg/kg) | <300 | 78 |
| Total mercury chromium (on a dry basis)/(mg/kg) | <500 | 123 |
| Total nickel (on a dry basis)/(mg/kg) | <100 | 26 |
| Total zinc (on a dry basis)/(mg/kg) | <1200 | 800 |
| Total copper (on a dry basis)/(mg/kg) | <500 | 400 |
| Mineral oil (on a dry basis)/(mg/kg) | <500 | 86 |
| Benzo(a)pyrene (on a dry basis)/(mg/kg) | <2 | 0.1 |
| Polycyclic aromatics (PAHs) (on a dry basis)/(mg/kg) | <5 | 0.8 |
| Ascaris egg death rate/% | ≥95 | 100% |
| Coliform like bacterial value | ≤0.01 | Not detected |

Detection standard and results of sludge product 2 are as shown in Table 2 below.

TABLE 2

Detection results of sludge product 2

| Items | Limits prescribed in SQ-20 in chemical industry standard HG/T2521-2008 | Sludge product 2 |
|---|---|---|
| Active silica content/% | ≥20 | 26 |

The small-molecule organic water-soluble fertilizer prepared by using the sludge product 1 was used as a sample, and the sample was detected according to a method specified in national standard GB/T17419-2018. Results are as shown in Table 3.

TABLE 3

Detection results of small-molecule water-soluble fertilizer

| Items | Limits specified in national standard GB/T17419-2018 | Small-molecule water-soluble fertilizer |
|---|---|---|
| Organic matter content/% | ≥10 | 12 |
| Total N + $P_2O_5$ + $K_2O$ amount/% | ≥8 | 9.8 |
| pH value (1 + 250 fold dilution with water) | 2-9 | 4.5 |
| Water-insoluble matter/% | ≤0.5 | 0.3 |

The heavy metal-containing ferrite prepared by using the sludge product 1 was used for iron making materials to replace iron mine powders, and detected according to iron mine powder standard YB/T4267-2011 in metallurgical industry. Results are as shown in Table 4.

TABLE 4

Detection results of ferrite

| Items | Iron concentrate fine powder standard in metallurgical industry. | Ferrite |
|---|---|---|
| TFe (total iron) content % | 48%-65% | 68% |

The above descriptions are only preferred embodiments of the present disclosure. It should be noted that several improvements and modifications can also be made by persons of ordinary skill in the art without departing the principle of the present disclosure, and these improvements and modifications should also be considered as the scope of protection of the present disclosure.

What is claimed is:

1. A treatment method for complete harmless treatment of activated sludge and complete resource utilization of activated sludge's products, comprising the followings steps:
   SI, adjusting the pH of activated sludge below 5 to obtain a mixture 1;
   S2, performing ultrasonic treatment on the mixture 1 to obtain a mixture 2;
   S3, performing microwave treatment and/or vapor treatment on the mixture 2 to obtain a mixture 3;
   S4, performing solid-liquid separation on the mixture 3 to obtain a liquid portion 1 and a solid portion 1;
   S5, mixing the solid portion 1 with a composite mineralizing agent and a mineralization bactericide for mineralization treatment to obtain a mineralized product, and
   S6, mixing the mineralized product with an acidifying agent for acidification treatment to obtain an acidified product, so as to accomplish the complete resource utilization of activated sludge;
   wherein,
   the liquid portion 1 in S4 is used for preparing an organic fertilizer and/or a ferrite material; the acidified product in S6 is used for preparing industrial silica sol.

2. The treatment method according to claim 1, wherein in S2, the frequency of the ultrasonic treatment is 5-40 KHz; and
   the intensity of the ultrasonic treatment is 1-30 $W/cm^2$.

3. The treatment method according to claim 2, wherein in S2, the temperature of the ultrasonic treatment is 60-90° C.; and
   the time of the ultrasonic treatment is 30-100 min.

4. The treatment method according to claim 1, wherein in S3, the frequency of the microwave treatment is 500-1000 MHz;
   the power of the microwave treatment is 5-10 W/g;
   the temperature of the vapor treatment is 120-180° C.; and
   the time of the vapor treatment is 1~4 h.

5. The treatment method according to claim 4, wherein in S3, the temperature of the microwave treatment is 120-180° C.; and
   the time of the microwave treatment is 180-250 s.

6. The treatment method according to claim 1, wherein the composite mineralizing agent contains Cao and MgO, and a weight ratio of Cao to MgO in the composite mineralizing agent is 6-8:3;
   when the solid portion 1 is mixed with the composite mineralizing agent, a mass ratio of the solid portion 1 to the composite mineralizing agent is 100:1-10;
   the mineralization bactericide contains a *bacillus*;
   the viable count of the *bacillus* is 1-5×$10^8$ bacteria/mL; and
   a mass ratio of the mineralization bactericide to the solid portion 1 is 1-10:100.

7. The treatment method according to claim 6, wherein the mineralization treatment adopts alkaline conditions;
   the temperature of the mineralization treatment is 20-40° C.; and
   in the mineralization treatment, the oxygen content is controlled at 3 mg and above.

8. The treatment method according to claim 1, wherein the acidifying agent is a sulfuric acid aqueous solution, and the volume fraction of the sulfuric acid aqueous solution is 20-40%; and
   a mixing weight ratio of the mineralized product to the acidifying agent is 1:3-5.

9. The treatment method according to claim 8, wherein the temperature of the acidification treatment is 250-350° C.; and
   the time of the acidification treatment is 2-6 h.

10. The treatment method according to claim 1, wherein after the liquid portion 1 is obtained in S4, heavy metals are removed to obtain heavy metal-containing ferrite and a liquid portion 2;
    the liquid portion 2 is used for preparing a small-molecule organic water-soluble fertilizer; and
    the heavy metal-containing ferrite is used for preparing iron ore powders.

* * * * *